(12) United States Patent
Whitmer

(10) Patent No.: US 6,651,959 B1
(45) Date of Patent: Nov. 25, 2003

(54) MECHANICAL CABLE THREADER

(76) Inventor: Michael Whitmer, 13018 Emporia, Houston, TX (US) 77015

( * ) Notice: Subject to any disclaimer, the term of this patent is extended or adjusted under 35 U.S.C. 154(b) by 0 days.

(21) Appl. No.: 10/156,301

(22) Filed: May 28, 2002

(51) Int. Cl.[7] .............................................. E21C 29/16
(52) U.S. Cl. .............................................. 254/134.3 FT
(58) Field of Search ........................... 254/134.3 FT, 254/134.3 R, 29 R, 249, 252, 257, 134.6

(56) References Cited

U.S. PATENT DOCUMENTS

| | | | | |
|---|---|---|---|---|
| 2,559,160 A | * | 7/1951 | Jacob | 254/134.3 FT |
| 2,736,532 A | * | 2/1956 | Hughes | 254/134.3 FT |
| 3,312,128 A | * | 4/1967 | Wasson | 254/134.3 R |
| 3,998,428 A | * | 12/1976 | Miles | 254/29 R |
| 5,431,370 A | * | 7/1995 | Verkuylen et al. | 254/134.3 FT |
| 5,484,135 A | * | 1/1996 | Golden et al. | 254/134.3 FT |
| 5,884,901 A | | 3/1999 | Schilling | |

* cited by examiner

Primary Examiner—Robert C. Watson
(74) Attorney, Agent, or Firm—Richard L. Moseley

(57) ABSTRACT

A tool is disclosed which comprises a chute with a ratcheting mechanism that jacks a cable through the chute to the desired remote location. The ratcheting mechanism comprises two "dogs" that work in tandem, the first to grip and advance the cable and the second to prevent the cable from retracting as the first is repositioned back along the cable. The first "dog" is mounted on a plunger in a chamber which is connected to the chute. The second "dog" is mounted in a retained attached to the chamber opposite the chute.

13 Claims, 3 Drawing Sheets

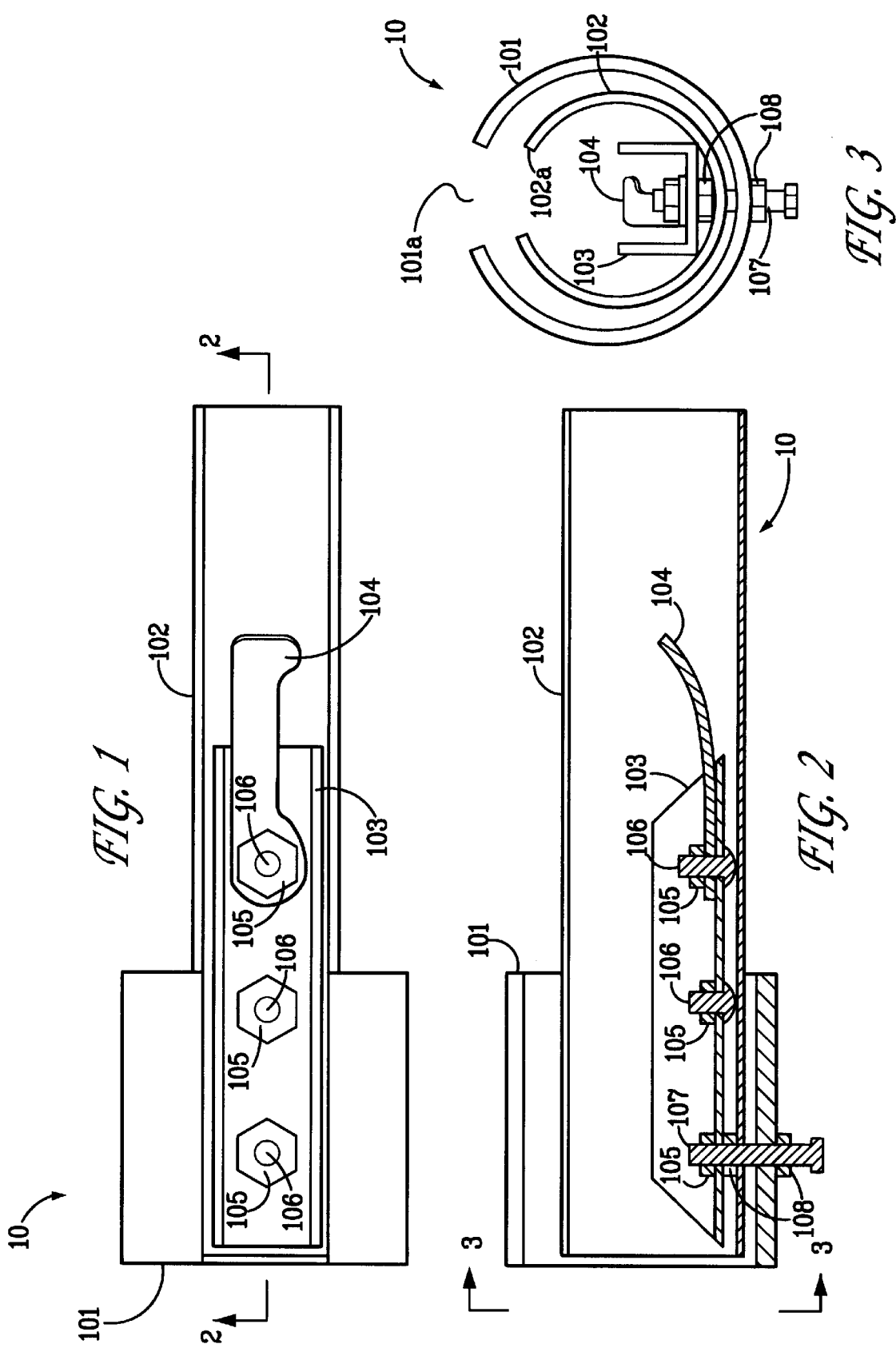

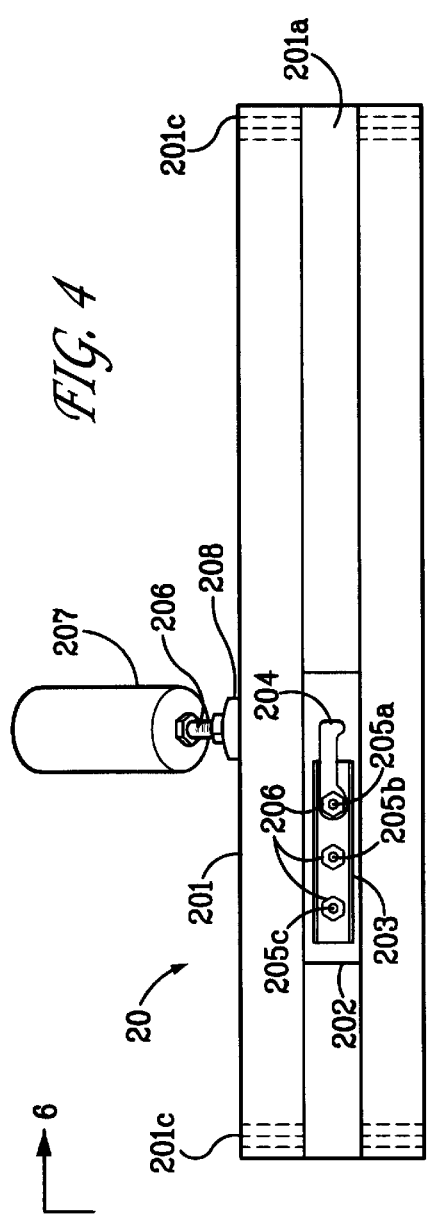
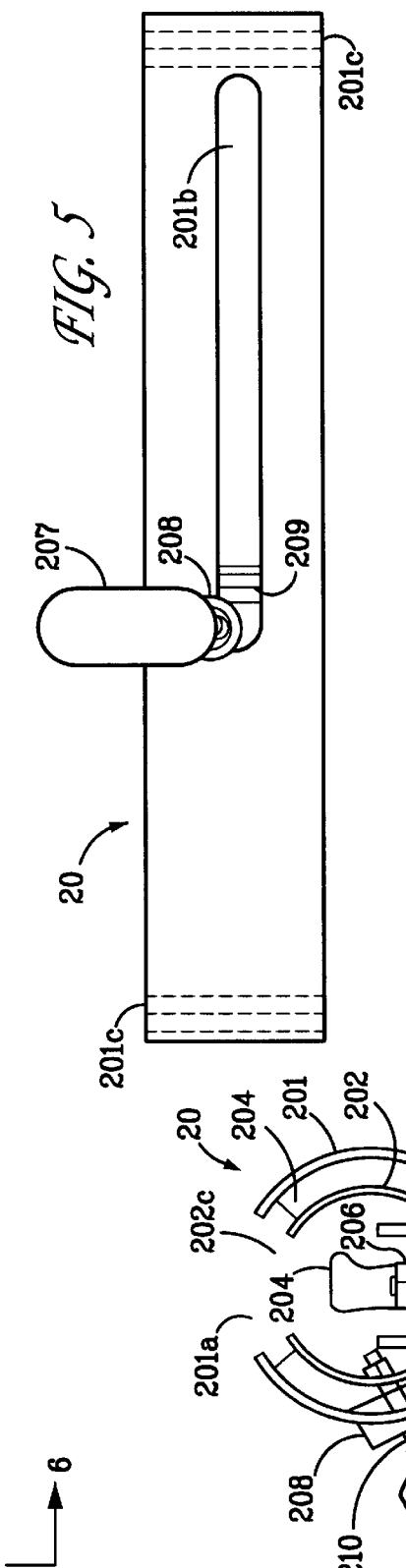
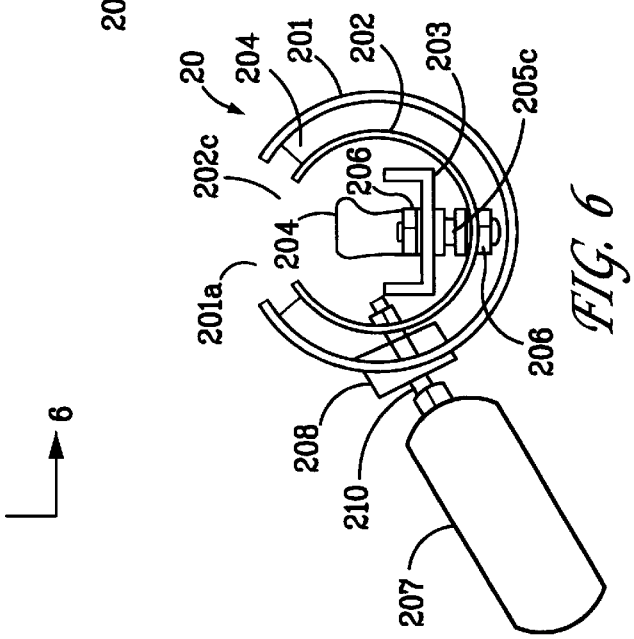

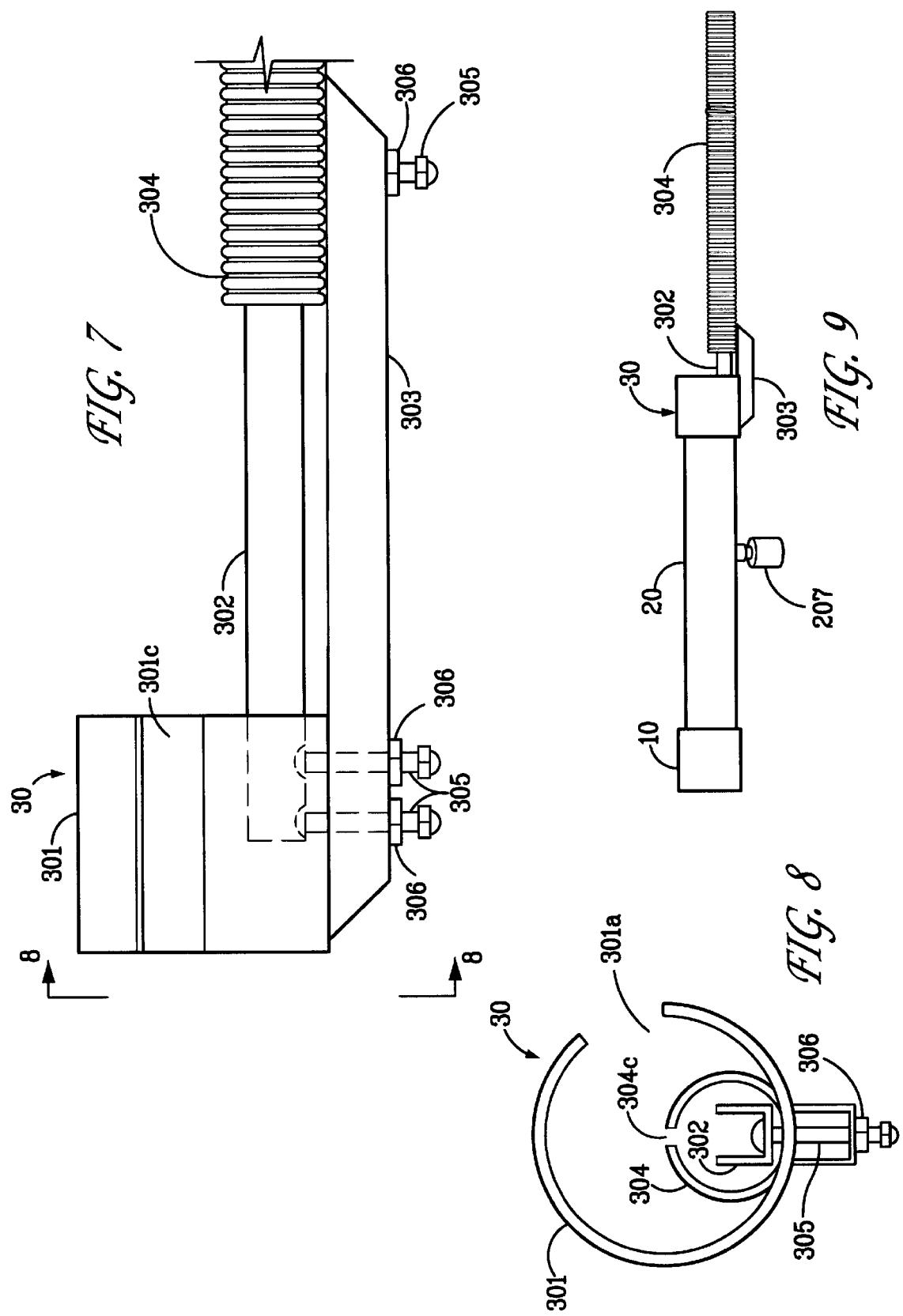

MECHANICAL CABLE THREADER

BACKGROUND OF THE INVENTION

1. Field of the Invention

The present invention relates to a mechanical device for feeding cable, especially armored cable, to a remote distance from the user. The cable threader is especially useful for threading cable above the users head in new construction where bar joists usually serve as the support for cables. The inventions relates more specifically to a device that feeds the cable by a ratchet like through a chute to the desired location.

2. Related Information

In new construction, especially commercial, overhead rafters or pre ceiling supports usually consist of bar joists which serve as the support for the required cable, usually armored, during installation or "rough in". The standard practice consists of climbing up and down step ladders and threading the cable through the rafters which can become tedious and tiresome, especially when numerous cables, including electrical, phone and data line, have to be installed. The material on the job site must be continually moved about to allow room for setting up of the ladders and platforms. Climbing up and down ladders always presents a hazard in the form of a potential fall.

SUMMARY OF THE INVENTION

Briefly the present invention comprises a chute with a ratcheting mechanism that jacks a cable through the chute to the desired remote location. The ratcheting mechanism comprises two "dogs" that work in tandem, the first to grip and advance the cable and the second to prevent the cable from retracting as the first is repositioned back along the cable. The first "dog" is mounted on a plunger in a chamber which is connected to the chute. The second "dog" is mounted in a retained attached to the chamber opposite the chute.

The complete assembled tool comprises:

(a) a body comprising a first cylindrical conduit and having a first longitudinal slot expanding its entire length and a second L shaped slot having the long leg of the L along the longitudinal axis of said conduit;

(b) a plunger moveably mounted within said first cylindrical conduit and having a handle extending through said L shaped slot;

(c) a first dog mounted on said plunger (d) a second cylindrical conduit rotatably connected to one end of said first cylindrical conduit said second cylindrical conduit having a longitudinal spanning its entire length;

(e) a second dog mounted within said second cylindrical conduit; and (d) a chute comprising a flexible conduit mounted about a rigid support, said rigid support being mounted to a cylindrical coupling which is threadedly connected to the end of said first cylindrical conduit on the end opposite said second cylindrical conduit.

BRIEF DESCRIPTION OF THE DRAWING

FIG. 1 is top view of one embodiment of the retainer of the present invention.

FIG. 2 is a side elevational view in partial cross section of the retainer of FIG. 1.

FIG. 3 is and end view of the retainer of FIG. 1 taken along line 3—3.

FIG. 4 is a top view of one embodiment of the chamber of the present invention.

FIG. 5 is a side view of the chamber of FIG. 4.

FIG. 6 is and end view of the chamber of FIG. 4 taken along line 6—6.

FIG. 7 is a side view of one embodiment of the chute of the present invention.

FIG. 8 is an end view of the chute of FIG. 7 taken along line 8—8.

FIG. 9 is a side view of the assembled device of the present invention.

DESCRIPTION OF THE PREFERRED EMBODIMENT

For a detailed description of the preferred embodiment the reader is directed to the accompanying figures in which like components are given like numerals for ease of reference.

Referring first to FIG.'s 9 the overall assembly of the tool of the present invention is shown to consist of a chamber 20 which has the retainer 20 connected to one end, as by threads, and the chute 30 connected to the opposite end, also by threads.

Referring now to FIG.'s 7 and 8 the chute 30 comprises an eight foot length of ¾ inch rigid aluminum channel 302. The channel 302 is encased in sections of 1 inch electrical flex tubing 304 along its entire length. The tubing has a split 304a along its entire length, which is located directly over the open side of the aluminum channel 302. The split allows for the removal and separation of the tool from the cable which is being worked. The aluminum channel 302 is attached to a 1½ inch rigid aluminum coupling 301 by two machine screws 305. A piece of ½ inch aluminum channel 303 is attached to the underside of the aluminum channel 302 and tubing 304 for part of its length to lend stability to the chute and its connection. The 1½ inch coupling 301 includes a longitudinal slot 301a to allow for removal of the cable after placement.

Referring now to FIG.'s 4–6 the chamber 20 is described. A modified section of rigid aluminum 1½ inch conduit 201 serves as the body of the chamber 20. The body 201 is about 20 inches long and has pipe threads 201c on both ends. The body includes one longitudinal slot 201a which spans the entire length and a s second L shaped slot 201b having its long leg also along the longitudinal axis of the body. The second slot is about 30–40° radially from the first.

A plunger 202 is placed in the body 201 which comprises a piece of 1½ inch thin wall aluminum tubing about five inches long. It also includes a slot 202c which spans its entire length. Thin pieces of nylon 209 are attached on the outer surface of the plunger 202 to act as bearings to reduce friction as the plunger is moved within the chamber. A handle 207 is attached to the plunger by a 5⅝ inch piece of ¼ inch all thread rod 210 which projects through the L shaped slot 201b. The handle can rotate the plunger 202 to the limit of the short leg of the slot 201b.

The plunger 202 houses a latching anti-reverse (ratcheting) mechanism which is referred to as a "dog". The standard definition of a "dog" in this sense is provided by *Merriam Webster's Collegiate Dictionary Tenth Edition* as "3 a: any of various usu. simple mechanical devices for holding, gripping, or fastening, that consist of a spike, bar or hook". The "dog" in the plunger comprises a metal bar 204 of spring steel and curved upward. The "dog" grips the cable and advances the cable as the plunger 203 is moved along the body 201 by the handle moving long the long leg of the L shaped slot 201. As the plunger 203 is retracted the "dog" slides along the cable which is held in place by a second "dog" which is described herein below as part of the retainer. The "dog" 204 is mounted on one end of a piece of ½ inch aluminum channel 203 by nut 206 on bolt 205*a*. The aluminum channel 203 is held in plunger 203 by bolts, 205*a*, 205*b*, 205*c* and nuts 206. A spring (not shown) under bolt 205*b* may be required to raise the "dog" end of the channel 203 slightly to provide the proper angle of the "dog" to grip the cable. Proper shaping and selection of the "dog" would eliminate the need for such.

The "dog" of the retainer 10 is of similar construction as that in the chamber. A piece of 1½ inch thin wall aluminum tubing 102 is secured to a 1½ inch aluminum coupling 101 by screw 107 and nuts 105 and 108. The "dog" construction is identical to that in the plunger comprising a curved spring steel bar 104 mounted on one end of a piece of ½ inch aluminum channel 103 by nut 105 on bolt 106. Both the coupling 101 and the thin wall tubing 102 include aligned longitudinal slots 101*a* and 102*a*.

The assembled tool comprises the retainer 20 threaded onto one of the chamber 20 with the chute 30 threaded on the opposite end such that the slot 301*a* in coupling 301 is not aligned with the slot 201*a* to prevent the cable from being ejected instead of being passed through the chute.

In operation the tool is loaded with cable by rotating the retainer on the end of the chamber until the slots 101*a*, 102*a*, 201*a* and 202*a*. The slot 202*a* is aligned by rotating the handle 207 into the short leg of the L shaped slot 201*b*. The leading end of the cable is place to line up with end of the support channel 303 ends. The cable is then pushed into the aligned open slots noted above. The coupling 101 is then rotated to close its slot, locking the cable in place. The handle 207 is then rotated to align close the chamber and align the all thread rod 206 with the long leg of the L shaped slot 201*b*.

The end of the chute is placed on the desired remote location such as the bottom section of a bar joist rafter. The handle 207 is advanced in slot 201*b* with the "dog" 204 gripping and advancing the cable through the chute. When the handle reaches it full travel forward, the operator pulls the handle back to the rear of the slot 201*b*. The "dog" 204 releases the cable and slides smoothly along the cable as the plunger 203 is retracted. The stationary "dog" 104 in retainer grips the cable and prevents it from sliding backwards. A continuous back and forth motion of the handle is required for the tool to function properly. Eventually the leading end of the cable exits the end of the chute. The operator can choose however much cable is needed by continuously moving or "pumping" the handle 207 on the plunger 203. In the case of running cable over bar joists enough cable would to threaded across to hang down that the end could be grasped and pulled manually. Enough slack must be provided for threading over the next joist.

Once enough cable is hanging, the tool must be unloaded. The handle 207 on the plunger 203 is "parked" in the short leg of the L shaped slot 201*b*. Then the coupling 101 is rotated to again align all of the slots. The cable is first removed from the retainer 10 and chamber 20 and then out of the chute 304 through the slit 304*a* in the top.

The foregoing description of the invention has been directed to a particular preferred embodiment of the present invention for the purposes of explanation and illustration. It will be apparent to those skilled in the art that many modifications and changes in the apparatus may be made without departing from the scope and spirit of the invention. It is therefore intended that the following claims cover all equivalent modifications and variations as fall within the scope of the invention as defined by the claims.

The invention claimed is:

1. A tool for threading a cable to a position remote from the user comprising:
   (a) a chute comprising a flexible conduit mounted about a rigid support, said chute secured to one end of a body; and
   (b) a ratcheting mechanism mounted in said body to advance a cable through said chute.

2. The tool according to claim 1 wherein said ratcheting mechanism comprises a moveable first dog for advancing the cable and a stationary second dog to prevent the cable from being retracted as said first dog is repositioned.

3. The tool according to claim 1 wherein said flexible conduit has a slit for its entire length.

4. The tool according to claim 2 wherein said body comprises a first cylindrical aluminum conduit having a first longitudinal slot expanding its entire length and a second L shaped slot having the long leg of the L along the longitudinal axis of said conduit.

5. The tool according to claim 4 wherein said first dog is mounted on a plunger within said conduit, said plunger having a handle extending through said L shaped slot for advancing said plunger the length of said L shaped slot.

6. The tool according to claim 4 wherein said stationary second dog is mounted in a second cylindrical conduit threadedly connected to one end of said first cylindrical conduit.

7. The tool according to claim 4 wherein said chute comprises a flexible conduit mounted about a rigid support, said rigid support being mounted to a cylindrical coupling which is threadedly connected to the end of said first cylindrical conduit on the end opposite said second cylindrical conduit.

8. The tool according to claim 4 wherein each of said dogs comprise a semi rigid metal bar which grips the cable.

9. A tool for threading a cable or other flexible conduit to a position remote from the user comprising:
   (a) a body comprising a first cylindrical conduit and having a first longitudinal slot expanding its entire length and a second L shaped slot having the long leg of the L along the longitudinal axis of said conduit;
   (b) a plunger moveably and rotatably mounted within said first cylindrical conduit and having a handle extending through said L shaped slot;
   (c) a first dog mounted on said plunger
   (d) a second cylindrical conduit rotatably connected to one end of said first cylindrical conduit, said second cylindrical conduit having a third longitudinal slot spanning its entire length;
   (e) a second dog mounted within said second cylindrical conduit; and
   (d) a chute comprising a flexible conduit mounted about a rigid support, said rigid support being mounted to a cylindrical coupling which is threadedly connected to the end of said first cylindrical conduit on the end opposite said second cylindrical conduit.

10. The tool according to claim 9 wherein each of said dogs comprise a semi rigid metal bar which grips the cable.

11. The tool according to claim 9 wherein said cylindrical coupling has a fourth longitudinal slot expanding its entire length and said cylindrical coupling is threadedly connected to said first cylindrical conduit such that said second longitudinal is not in alignment with said first longitudinal slot.

12. The tool according to claim 9 wherein said plunger comprises a third cylindrical conduit having a fifth longitudinal slot spanning its entire length and said handle is secured to said third cylindrical conduit through said L shaped slot.

13. The tool according to claim 12 wherein said first dog comprises a semi rigid metal bar mounted in a channel secured to said third cylindrical conduit.

\* \* \* \* \*